July 26, 1966 J. H. MEIER 3,262,462
JET-NOZZLE TYPE INDICATOR
Filed July 31, 1963 3 Sheets-Sheet 1

INVENTOR
JOHANN HANS MEIER
BY *Richard H. Smith*
AGENT

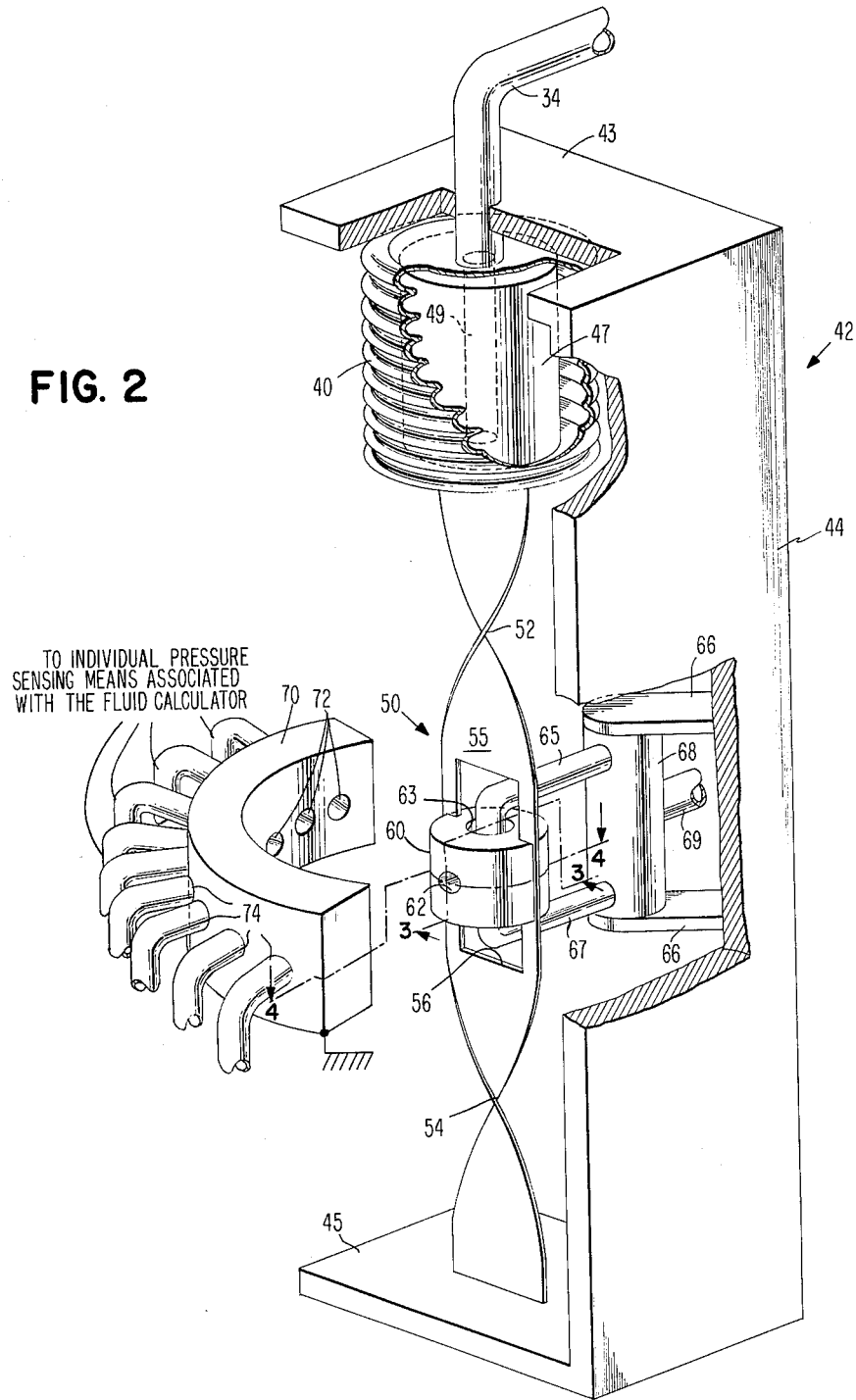

July 26, 1966  J. H. MEIER  3,262,462
JET-NOZZLE TYPE INDICATOR
Filed July 31, 1963  3 Sheets-Sheet 3

United States Patent Office 3,262,462
Patented July 26, 1966

3,262,462
JET-NOZZLE TYPE INDICATOR
Johann Hans Meier, Vestal, N.Y., assignor to International Business Machines Corporation, New York, N.Y., a corporation of New York
Filed July 31, 1963, Ser. No. 298,947
9 Claims. (Cl. 137—83)

This invention relates to an indicating device, and, more particularly, to an indicating device that is compatible with a pneumatic logic system and which may function to adapt such a system to the control of industrial processes.

Pneumatic logic systems are reliable, extremely inexpensive "decision making" devices. Such logic devices are the fluid-flow analogies of the well-known electrical and electromechanical logical computers. A pneumatic logic "circuit" comprises, basically, a network of fluid handling ducts fed by a low-pressure fluid compressor or by a fan. Pressure differentials may be selectively created at various points within the network to divert or amplify fluid streams, thereby providing desired logical outputs.

The structural elements of pneumatic computers involve few, often no, moving parts and can be stamped or molded in production lots out of inexpensive materials such as plastic. These features are paramount in explaining the desirability of pneumatic logic systems.

In applying fluid logic to the control of various operations, such as industrial processes, means are required for monitoring the parameters of the operation to be controlled and for indicating to the logic system the values of those parameters in terms compatible with the system. Thus, such indicating devices must be capable of converting measurements of electrical current, weight, pressure or any measurable condition which might be associated with an industrial process, into an intelligible fluid input. In order not to defeat the primary purpose for which the fluid logic system was chosen in the first instance, it is necessary that these indicating devices be, like the logic system itself, simple and inexpensive to manufacture, yet highly reliable in operation.

It is therefore an object of the present invention to provide a pneumatic indicating device that is simple and inexpensive to manufacture.

A further object is to provide a pneumatic indicator that is compatible with a fluid logic system.

Another object is to provide a pneumatic indicator which has low inertia and which thus responds quickly and accurately to slight variations in the external conditions under observation.

Yet another object is to provide a pneumatic indicator that operates without frictional contact between adjacent moving parts.

Still another object is to provide an analog-to-digital pneumatic indicator.

In accordance with the present invention measurements of the condition under observation are quantitatively depicted by the position of a linearly movable mechanism. Slight changes in the position of this mechanism cause, through the torsional elastic deformation of a twisted strip of elastic material, relatively great changes in the direction of a stream of fluid. These directional shifts are converted to pressure changes which may be utilized as the input to a pneumatic logic system.

The foregoing and other objects, features and advantages of the invention will be apparent from the following more particular description of preferred embodiments of the invention, as illustrated in the accompanying drawings.

In the drawings:
FIG. 1 is a schematic diagram illustrative of the process control feature of the present invention.

FIG. 2 is a schematic diagram, in perspective and partially cut away, of a preferred embodiment of the indicator of the invention.

Before proceeding with the detailed description of a preferred embodiment of the invention, it would be well to describe, generally, the type of process control application in which the invention may be employed. For purposes of illustration the Haber process for the commercial production of ammonia is herein considered as one example of a process controllable, at least in part, through the use of the invention.

Figure 1:
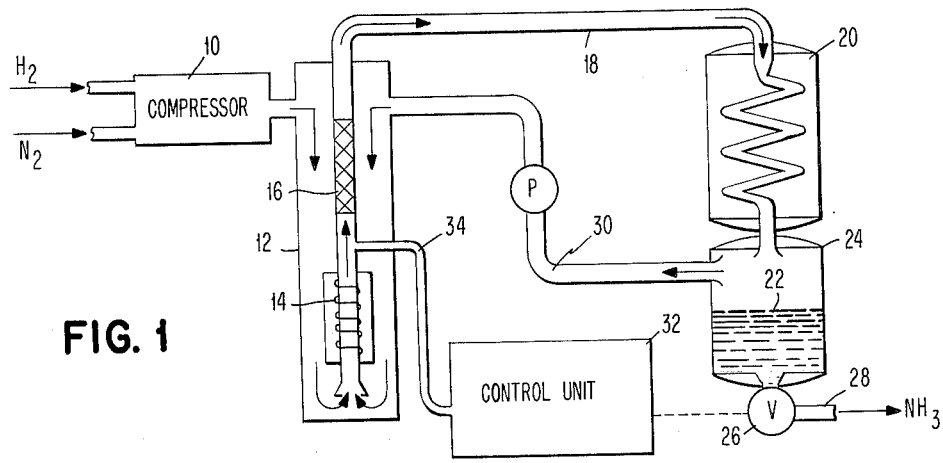

Referring to FIG. 1, the Haber process comprises the steps of compressing, in compression chamber 10, nitrogen and hydrogen gases mixed in a one to three volumetric ratio, passing the pressurized mixture into a reaction chamber 12, and running it first past a set of heating coils 14 and then through a catalytic agent 16, such as iron oxide mixed with potassium aluminate. In the presence of the catalyst and further encouraged by the heat and pressure, some of the hydrogen and nitrogen react to form ammonia. Thus, an equilibrium mixture consisting of hydrogen, nitrogen and ammonia passes through a conduit 18 to a condensation chamber 20 where the ammonia gas is condensed out. The ammonia condensate 22 collects in a trap 24 and is extracted from the system through a valve 26 and outlet conduit 28. The uncombined nitrogen and hydrogen gases are returned from the trap to the reaction chamber via a conduit 30 and are thereafter recirculated through the reaction proces.

The percent by volume of ammonia present in the equilibrium mixture passing to the condensation chamber through conduit 18 varies enormously as a function of the temperature and pressure of the reactant gases in the reaction chamber. The higher the temperature therein, the lower the ammonia yield, while the higher the pressure, the higher the yield. For example, a temperature of 500° C. an pressure of one atmosphere in the reaction chamber result in an ammonia yield of $2/10$ of 1 percent. By reducing the reaction temperature to 200° C. and increasing the pressure to 100 atmospheres a yield of better than 80 percent is obtained.

In order to maintain continuous, stable operation of the process it is desirable to remove the ammonia condensate from the trap 24 at the same rate that it accumulates therein. The latter rate at any given point in time depends directly upon the percentage ammonia yield then being generated by the reaction process. It therefore becomes desirable to control the operation of the valve 26 in accordance with the level of yield. A control unit 32, operating on fluid logic principles, is therefore provided to continuously (or at discrete intervals) measure the temperature and pressure in the reaction zone, to calculate from this input data the resultant ammonia yield, and to operate an output valve 26 accordingly. This maintains the ammonia backlog in the trap at an even level, keeping constant the total gaseous volume in the process apparatus and guarding against the dangers associated with overfilling the trap or those associated with draining the trap dry.

The present invention provides an indicating device to be used within a pneumatic control unit, such as the unit 32, for gaging the parameters of the process under control and for indicating, in fluid logic terms, the values of these parameters to the pneumatic calculating apparatus of the control unit. It may thus be said that the present invention serves as a data input device in that it quantitatively measures some physical condition under observation, generates a pneumatic logic input representative of the quantity measured, and conveys that input to a pneumatic logic system.

The specific embodiment described below is adapted to measure the pressures within a system, but other parameters, such as temperature or electrical current flow, may be gaged as well by means of subsequent suggested modifications of the specific embodiment hereinafter disclosed. As noted above, the pneumatic logic system, per se, hereinafter referred to as the pneumatic calculator, is also included as part of the control unit 32. However, since the calculator is not an integral part of the present invention it will not be described in detail. Pneumatic logic blocks, such as AND and OR "circuits," would be the basic elements of such a calculator and are well known in the art. Similarly, the mechanism used to operate the valve 26 in accordance with the output from the calculator may be any suitable pressure controlled valve actuating mechanism.

Referring to FIG. 2, a pressure inlet tube 34 which derives its input pressure from the reaction chamber 12 (FIG. 1) is joined to a bellows member 40. The upper portion of the bellows is rigidly fixed to a horizontal arm 43 of a rigid C frame 42. The bellows is of stiff metal construction and is adapted to flex small distances in a vertical direction in response to changes in its internal pressure. Since the inside of the bellows is made a part of the pressure system of the reaction chamber 12 through the pressure tube 34, the vertical position of the lower portion of the bellows is representative of the magnitude of the pressure inside of the reaction chamber.

A cylindrical body 47 is mounted inside of the bellows in order to decrease the amount of "dead space" therein. A center hole 49 in the cylinder 47 allows inlet tube 34 to open into the bellows. The effect of the cylinder 47 is to decrease the response time of the bellows. That is, the amount of fluid in the bellows is minimized by the presence of the body 47 and fluid pressure changes inside of the bellows are thus more quickly converted into linear movements of the lower portion of the bellows.

A twisted metal ribbon 50 is connected between the lower surface of the bellows 40 and a lower horizontal arm 45 of the frame 42. As will become apparent, the function of this ribbon is of primary importance in the accomplishment of the objectives of the present invention. Basically speaking, the importance of the ribbon lies in the fact that a center portion 55 thereof rotates about its longitudinal axis in response to slight axial displacement at one end of the ribbon. It is thus seen that when the ribbon is connected between the frame and the bellows as illustrated in FIG. 2, vertical deflection of the lower portion of the bellows 40 is converted to angular deflection of the center portion 55 of the ribbon 50. This motion conversion is brought about by two sets of twists permanently set into the ribbon. In FIG. 2 these sets of twists are represented by the half-turns 52 and 54. The relative direction of the twists in the two sets must be opposed to one another.

A simple way of forming the two sets of twists in the ribbon is to clamp the ends of the ribbon while the center portion 55 is gripped in a wide pliers or other rotatable clamp and rotated about the longitudinal axis of the strip. The elastic limit of the material must be exceeded in the area of the twists so that permanent deformation results. The ribbon may be made of steel, although almost any metal will suffice, and may be on the order of a quarter of an inch wide and 15 to 25 mils thick. As mounted in FIG. 2, the ribbon should be under tension so as to elastically stress the twisted portions, thereby preventing any buckling or substantial lateral movement of the ribbon upon a downward deflection of the bellows 40.

A particular means of mounting bellows 40 to horizontal arm 43 of frame 42 is not shown in FIG. 2. The necessary tension for ribbon 50 could be provided through inlet tube 34 which is attached to the upper portion of bellows 40. Those skilled in the art will recognize that there are other suitable means of mounting bellows 40 to horizontal arm 43 such that the afore-mentioned tension is provided to ribbon 50 without affecting the movement of bellows 40 and ribbon 50.

This "twisted ribbon" principle of motion conversion is particularly well adapted for use in the present invention because slight linear deflections at the end of the ribbon result in relatively great angular deflections of the center portion 55. For example, if each set of twists in the ribbon has four full turns, rather than the half-turns illustrated in FIG. 2, ten to fifteen mils of bellows deflection results in approximately 90° of angular deflection of the center portion 55. This "amplification" is productive of an extremely sensitive indicating device.

A mounting slot 56 houses a cylindrical nozzle body 60. The nozzle body has a pair of intersecting ducts 62 and 63 (more clearly shown in FIG. 3), the latter of which coacts with a pair of fluid supply tubes 65 and 67. Nozzle body 60 is rigidly fixed to the ribbon and rotates along with center portion 55. The fluid supply tubes 65 and 67 connect to a manifold 68 which is fed by an input conduit 69. The input conduit is connected to a fluid pressure source, such as the main pressure source for the pneumatic calculating device of the control unit 32.

Figure 3:
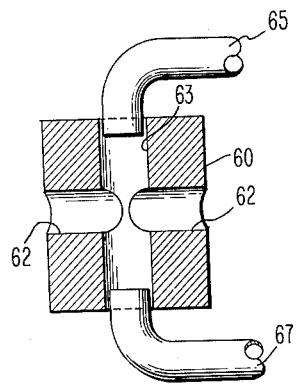
FIG. 3 is a sectional view of the nozzle element of the embodiment of FIG. 2 and is taken in a vertical plane through the line 3—3 of FIG. 2.

As shown in FIG. 3 the ducts 62 and 63 intersect at right angles and the duct 63 is aligned with the axis of the nozzle body so as to be concentric about the longitudinal axis of the ribbon 50. The end portions of the fluid supply tubes 65 and 67 project a short distance into the duct 63. It is important that there be no contact between the walls of the duct and the fluid supply tubes. The absence of such contact eliminates friction between the nozzle body 60 and the fluid supply tubes as the former rotates with the center portion 55 of the ribbon. This non-contacting relationship between the tubes 65 and 67 and the nozzle body 60 is produced by virtue of the fact that the end portion of each tube has an outside diameter which is slightly less than the diameter of the duct 63. The manifold 68 (FIG. 2) is rigidly secured to the mid-portion 44 of the frame 42 by the brackets 66 so that the tubes 65 and 67 are immovable once they have been adjusted to project into the duct 63 without touching the walls thereof.

Fluid issuing under pressure from the tubes 65 and 67 exits from the nozzle body 60 via the nozzle duct 62. This sets up two oppositely directed fluid streams moving away from the ribbon 50 and at right angles thereto. Some fluid escapes through the small gap between the walls of the duct 63 and the outer walls of the tubes 65 and 67, but since it is possible to make these gaps as ten mils, this type of fluid escapage is kept to a minimum.

Of note is the fact that by having two oppositely directed fluid streams issue from the nozzle body 60, lateral reaction forces on the ribbon 50 are equalized, thereby preventing substantial lateral movement of the ribbon. In addition, the above-mentioned escapage of air between the outer walls of the tubes 65 and 67 and the walls of duct 63 provides an air cushion which acts as a pad to attenuate any slight lateral movement of the nozzle body 60. This is a further assurance that the tubes 65 and 67 and the nozzle body 60 will be maintained in a desirable non-contacting relationship. Also, by making the bellows 40, the ribbon 50 and the supporting frame 42 of materials having the same linear coefficient of expansion, thermally induced variations in the stress of the ribbon 50 are eliminated. All these factors contribute to the accuracy and stability of operation of the device.

Figure 4:
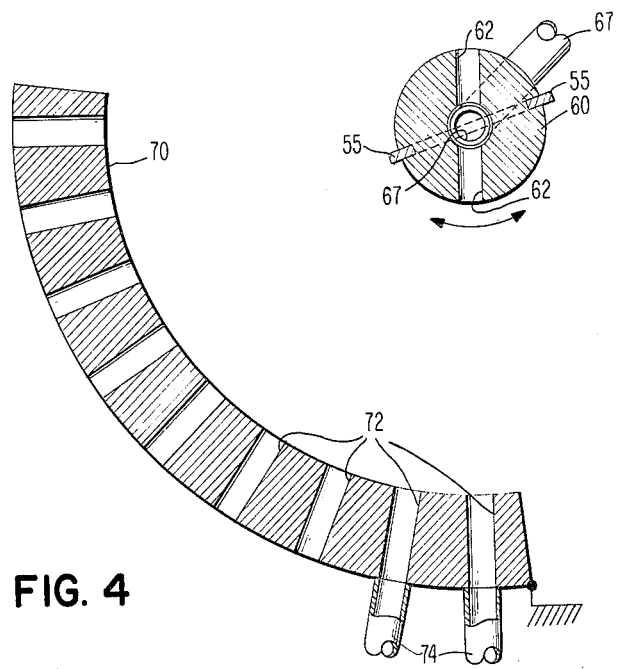
FIG. 4 is a sectional view of the nozzle and target elements of the embodiment of FIG. 2 and is taken in a horizontal plane through the line 4—4 of FIG. 2.

Referring back to FIG. 2, it is seen that a target member 70 is fixedly located so as to intersect the stream of fluid issuing from one end of the nozzle duct 62. A plurality of target holes 72 in the target member 70 are spaced in the plane of angular movement of the fluid stream. As shown in FIG. 4, eight holes 72 are evenly spaced along an arc of approximately 90°. There is thus one hole for each 13°, approximately, of nozzle body rotation. A plurality of output tubes 74 are connected, one each, to the plurality of target holes 72, and, as indicated in FIG. 2, join each of those holes with an individual pressure sensing device associated with the fluid calculating system of the control unit 32. Therefore, as the nozzle body 60 rotates about the longitudinal axis of the ribbon 50, a stream of fluid is directed to the target 70 and, for each 13° of rotation of the nozzle, creates a pressure differential at one of the target holes 72. This sends a pressure wave through or creates a pressure bias at the associated tube 74, which pressure "signal" serves as a data input to the pneumatic logic system of control unit 32.

As has been noted, the individual tubes 74 are connected to various pressure sensitive elements within the fluid logic network of the pneumatic calculator. The calculator "senses" the pressure within the reaction chamber 12 by noting which tube 74 is being pressurized by the fluid stream issuing from the rotating nozzle body 60. Since the specific configuration of the remaining components of the control unit 32 (the pneumatic calculator and the mechanism for controlling the valve 26 in accordance with the data output from the calculator) do not form a part of the present invention, further disclosure of them is deemed unnecessary. As has been indicated, such components may be fabricated by known techniques using state-of-the-art pneumatic control elements.

In operation, the pneumatic indicating device shown in FIG. 2 functions as hereinafter described. As the pressure of the system under observation (e.g., the ammonia manufacturing process of FIG. 1) increases, the bellows 40 lengthens a slight amount causing the nozzle body 60 to rotate in the clockwise direction (looking from the top of FIG. 2) through a relatively large arc. This alters the direction of the stream of fluid issuing from nozzle duct 62, sweeping it past one or more of the target holes 72 of the target 70. Each time the fluid stream sweeps past one of the holes 72, a pressure pulse is sent down the associated tube 74, generating an input to the pneumatic calculating device.

Because the target holes 72 are located at discrete points along the continuous path of movement of the fluid stream, the input provided to the pneumatic calculating device is a digital one. The apparatus of FIG. 2 may thus generally be described as an analog-to-digital converter.

In the context of the process control application previously described in connection with FIG. 1 it can be seen that the apparatus of FIG. 2 would function to supply the pneumatic calculating device of that unit with pneumatic signals representing the magnitude of pressure within the reaction chamber 12. This input data is one of the parameters governing, as before mentioned, the percentage ammonia yield generated by the process. A calculation is made by the control unit and the resultant data output, i.e., magnitude of ammonia yield, is utilized to control the operation of outlet valve 26. Thus, the present invention enables a pneumatic calculating system to be used to control at least one aspect of an industrial process.

Figure 6:
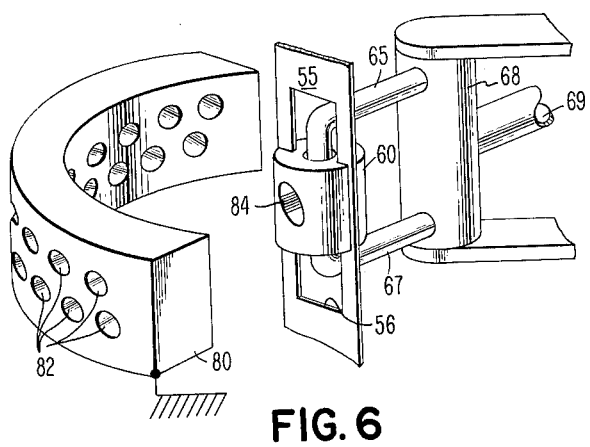
FIG. 6 is a schematic diagram, in perspective, illustrating a third embodiment of the invention.
Figure 5:
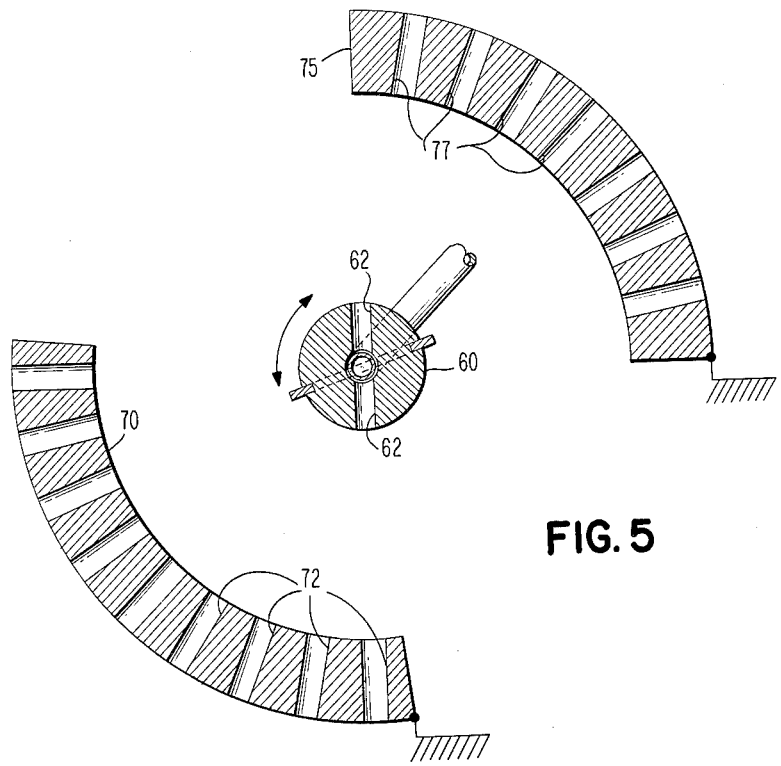
FIG. 5 is a sectional view similar to that in FIG. 4 and illustrates a second embodiment of the invention.

It can be seen from FIGS. 2 and 4 that in order to provide a sensitive input to the logic system the target holes 72 should be spaced as closely as possible. Because it is desirable to place the target fairly close to the nozzle body 60, there is a definite limit as to how many holes 72 can be included within the 90° arc of the target. FIGS. 5 and 6 illustrate two modifications of the target of FIG. 2 which help to overcome the above limitation, rendering the indicating device of the present invention more sensitive to changes in the condition being measured.

FIG. 5 shows an aditional target member 75 mounted on the other side of the nozzle body 60 from the target 70. A series of equally spaced target holes 77 is located in the target 75 and coacts with the second fluid stream issuing from the nozzle duct 62. The positions of the target holes 77 are angularly staggered in relation to the positions of the target holes 72. Thus as the nozzle body 60 rotates in a clockwise direction a pressure signal is generated first in the right-hand target hole 72. After approximately 6½° of further rotation, a pressure signal is generated in the left-hand target hole 77. Another 6½° of clockwise rotation generates a pressure input at the target hole 72 second from right. Another 6½° of rotation generates a pressure input at the target hole 77 second from left, and so on. It is thus seen that by utilizing both fluid streams issuing from the nozzle body 60, the degree of sensitivity of the device can be increased by a factor of two without the need for closer spacing of the target holes. Even greater sensitivity can be obtained by extending this principle through the use of additional holes in the nozzle body and additional target members.

The modification illustrated in FIG. 6 accomplishes the same result as the modification illustrated in FIG. 5, but exhibits a somewhat different principle of operation. As noted in FIG. 6 only a single target member 80 is employed. The target holes 82 are arranged in two parallel rows, one above the other. The holes of each row are evenly spaced and are staggered in relation to the holes of the other row. The nozzle body 60 is provided with an elongated outlet duct 84 so that the stream of fluid issuing therefrom is wide enough to impinge on both rows of target holes. The elongated duct 84 could just as well be two separate ducts positioned one above the other. As the nozzle body 60 rotates, pressure signals are created, alternatively, in the upper and lower rows of holes 82.

While the principal embodiment of the present invention includes a bellows member for gaging the pressure condition of the system under observation, it is to be noted that by the substitution of other transducer devices in place of the bellows 40 quantities and conditions other than pressure can be monitored. For instance, a moving actuator electrical coil having a D.C. bias current flowing through it could be connected to the upper end of the ribbon 50. Slight changes in the amount of current flowing in the coil would alter the amount of axial stress on the ribbon thus producing substantially the same results above-described in connection with the bellows element. The present invention would thus be provided with a capacity to gage and to convert into pneumatic digital signals varying magnitudes of current flow within an electrical system. Likewise, an appropriately arranged bimetallic element could be substituted in place of the bellows 40, giving the device a capacity to monitor the temperature conditions of a system.

In recapitulation, it is seen that the present invention provides an indicating device that is simple, inexpensive and compatible with a fluid logic system. Further, the only substantial movement associated with its operation is the rotation of the center portion 55 of ribbon 50 and nozzle body 60 about the longitudinal axis of the ribbon. Because the mass of this rotating system is kept close to its axis of rotation, the angular inertia of the system is minimized. Further reduction in inertia is possible by using lightweight materials, such as aluminum, in the construction of the nozzle body 60. In addition, the air-cushioned relationship between the nozzle body 60 and the fluid supply tubes 65 and 67 (FIG. 3) allows the device to operate substantially without friction between its moving parts. This further contributes to the accuracy, sensitivity and reliability of the device. Finally, the provision of target holes at discrete locations in the target element enables the device to be used with a digital fluid logic system. In essence, the output generated at the target holes of the apparatus represents the digital equivalent of analog variations occurring in a physical condition under observation. Finally, an illustration has been provided as to the manner in which the present invention can be utilized to adapt a pneumatic calculating system for use as an industrial process control instrument.

While the invention has been particularly shown and described with reference to preferred embodiments thereof, it will be understood by those skilled in the art that the foregoing and other changes in form and details may be made therein without departing from the spirit and scope of the invention.

I claim:

1. In a pneumatic indicating device for indicating the physical state of a system under observation, the combination comprising:

an elongated strip of elastic material, said strip having formed therein at least two permanently set, oppositely directed axial twists;

a frame member for supporting, at one end, said elongated strip in an axially stressed condition;

transducer means connected to said frame and to the other end of said elongated strip for varying the axial stress on said strip in accordance with variations in the physical state of the system under observation, the portion of said strip located between said axial twists thereby being caused to rotate about the axis of said strip an angular amount proportional to the degree of change in axial stress;

a nozzle rigidly mounted on said portion of said strip located between said axial twists, said nozzle being directed along a line having a component transverse to the axis of said strip;

means for supplying fluid under pressure to said nozzle whereby a stream of fluid issues from said nozzle along said line; and means for detecting changes in the direction of said stream of fluid.

2. In a pneumatic indicating device for indicating the physical state of a system under observation, the combination comprising:

an elongated strip of elastic material, said strip having formed therein at least two permanently set, oppositely directed axial twists, said strip also having a centrally positioned mounting slot located in the portion of said strip included between said twists;

a frame member for supporting, at one end, said elongated strip in an axially stressed condition;

transducer means connected to said frame and to said elongated strip for varying the axial stress on said strip in accordance with variations in the physical state of the system under observation, the portion of said strip located between said axial twists thereby being caused to rotate about the axis of said strip an angular amount proportional to the degree of change in axial stress;

a nozzle body mounted in said mounting slot of said elongated strip, said nozzle body including intersecting ducts, a first one of said ducts extending through said body along the axis of said strip and a second one of said ducts extending through said body transverse to said first duct;

first and second fluid supply tubes communicating with the outer ends of said first duct, a first end of each of said tubes projecting into a different end of said first duct, the outer walls of said projecting portions of said tubes being spaced from the walls of said first duct;

means for supplying fluid under pressure to the second ends of said fluid supply tubes whereby a stream of fluid is caused to issue from either end of said second duct; and means for detecting changes in the direction of one of said fluid streams.

3. In a pneumatic indicating device for indicating the fluid pressure state of a pressurized system under observation, the combination comprising:

an elongated strip of elastic material, said strip having formed therein at least two permanently set, oppositely directed axial twists;

a bellows member connected to an end of said elongated strip and having an opening through which the space inside of said bellows can be made a part of the pressurized system under observation, said bellows being adapted to fluctuate in size in accordance with changes in the fluid pressure inside of it;

a frame member for suspending said bellows and said elongated strip in an axially stressed condition, whereby pressure induced variations in the size of said bellows cause corresponding variations in the axial stress of said elongated strip, the portion of said strip located between said axial twists thereby being caused to rotate about the axis of said strip an angular amount proportional to the degree of change in said axial stress;

a nozzle rigidly mounted on said portion of said strip located between said reverse twists, said nozzle being directed along a line having a component transverse to the axis of said strip;

means for supplying fluid under pressure to said nozzle whereby a stream of fluid issues from said nozzle along said line; and means for detecting changes in the direction of said stream of fluid.

4. The pneumatic indicating device of claim 3 additionally including a closed body mounted inside of said bellows to minimize the amount of volume within said bellows exposed to said pressurized system.

5. In a pneumatic indicating device for indicating the physical state of a system under observation, the combination comprising:

an elongated strip of elastic material, said strip having formed therein at least two permanently set, oppositely directed axial twists;

a frame member for supporting, at one end, said elongated strip in an axially stressed condition;

transducer means connected to said frame and to said elongated strip for varying the axial stress on said strip in accordance with variations in the physical state of the system under observation, the portion of said strip located between said axial twists thereby being caused to rotate about the axis of said strip an angular amount proportional to the degree of change in axial stress;

a nozzle rigidly mounted on said portion of said strip located between said axial twists, said nozzle being directed along a line having a component transverse to the axis of said strip;

means for supplying fluid under pressure to said nozzle whereby a stream of fluid issues from said nozzle along said line, the direction of said stream being changeable in accordance with changes in the angular orientation of said portion of said strip located between said axial twists;

a target member spaced from said nozzle and intersecting the plane of angular movement of said stream of fluid, there being a plurality of holes in said target spaced along the line of intersection of said target and said plane of movement; and a plurality of pressure sensing devices communicating, one each, with said holes whereby there is produced a digital representation of the degree of angular movement of said stream of fluid as said stream is moved past said holes in response to variations in said axial stress.

6. In a pneumatic indicating device for indicating fluid pressure conditions of a pressurized system under observation, the combination comprising:

an elongated strip of elastic material, said strip having formed therein at least two permanently set, oppositely directed axial twists, said strip also having a centrally positioned mounting slot, said slot being located in the portion of said strip included between said twists;

a bellows member connected to an end of said elongated strip and having an opening through which the space inside of said bellows may be made a part of the pressurized system under observation, said bellows being adapted to fluctuate in length in accordance with changes in the fluid pressure inside of it;

a frame member for suspending said elongated strip and said bellows in an axially stressed condition whereby pressure induced variations in the size of said bellows cause corresponding variations in the axial stress on said elongated strip, the portion of said strip located between said axial twists thereby being caused to rotate about the axis of said strip an angular amount proportional to the degree of change in said axial stress;

a nozzle body mounted in said mounting slot of said elongated strip, said nozzle body including intersecting ducts, a first one of said ducts extending through said body along the axis of said strip and a second one of said ducts extending trough said body transverse to said first duct;

first and second fluid supply tubes communicating with the outer ends of said first duct, a first end of each of said tubes projecting into a different end of said first duct, the outer walls of said projecting portions of said tubes being spaced from the walls of said first duct;

means for supplying fluid under pressure to the second end of each of said fluid supply tubes whereby a stream of fluid is caused to issue from each end of said second duct, the direction of said streams being changeable in accordance with changes in the angular orientation of said portion of said strip located between said axial twists;

a target member spaced from said nozzle element and intersecting the plane of angular movement of a first one of said streams of fluid, there being a plurality of holes in said target spaced along the line of intersection of said target and said plane of movement; and a plurality of pressure sensing devices communicating, one each, with said holes whereby there is produced a digital representation of the degree of angular movement of said first stream of fluid as said stream is moved past said holes in response to variations in said axial stress.

7. The pneumatic indicating device of claim 6 additionally including a closed body mounted inside of said bellows to minimize the amount of volume within said bellows exposed to said pressurized system.

8. In a pneumatic indicating device for indicating fluid pressure conditions of a pressurized system under observation, the combination comprising:

an elongated strip of elastic material, said strip having formed therein at least two permanently set, oppositely directed axial twists, said strip also having a centrally positioned mounting slot, said slot being located in the portion of said strip included between said twists;

a bellows member connected to an end of said elongated strip and having an opening through which the space inside of said bellows may be made a part of the pressurized system under observation, said bellows being adapted to fluctuate in length in accordance with changes in the fluid pressure inside of it;

a frame member for suspending said elongated strip and said bellows in an axially stressed condition whereby pressure induced variations in the size of said bellows cause corresponding variations in the axial stress on said elongated strip, the portion of said strip located between said axial twists thereby being caused to rotate about the axis of said strip an angular amount proportional to the degree of change in said axial stress;

a nozzle body mounted in said mounting slot of said elongated strip, said nozzle body including intersecting ducts, a first one of said ducts extending through said body along the axis of said strip and a second one of said ducts extending through said body transverse to said first duct;

first and second fluid supply tubes communicating with the outer ends of said first duct, a first end of each of said tubes projecting into a different end of said first duct, the outer walls of said projecting portions of said tubes being spaced from the walls of said first duct;

means for supplying fluid under pressure to the second end of each of said fluid supply tubes whereby a stream of fluid is caused to issue from each end of said second duct, the direction of said streams being changeable in accordance with changes in the angular orientation of said portion of said strip located between said axial twists;

a first target member spaced from said nozzle element and intersecting the plane of angular movement of a first one of said streams of fluid, there being a plurality of holes in said first target spaced along the line of intersection of said first target and said plane of movement of said first stream;

a second target member spaced from said nozzle element and intersecting the plane of angular movement of the second one of said streams of fluid, there being a plurality of holes in said second target spaced along the line of intersection of said second target and said plane of movement of said second stream; and a plurality of pressure sensing devices communicating, one each, with said holes whereby there is produced a digital representation of the degree of angular movement of each of said streams of fluid as said streams are moved past said holes in response to variations in said axial stress.

9. The pneumatic indicating device of claim 8 additionally including a closed body mounted inside of said bellows to minimize the amount of volume within said bellows exposed to said pressurized system.

References Cited by the Examiner

UNITED STATES PATENTS

| | | | |
|---|---|---|---|
| 2,382,351 | 8/1945 | Thorpe | 73—143 X |
| 2,904,057 | 9/1959 | Callender | 137—83 |
| 3,062,455 | 11/1962 | Reip | 137—83 X |
| 3,067,617 | 12/1962 | Buck | 73—48 X |

WILLIAM F. O'DEA, *Primary Examiner.*

ALAN COHAN, ISADOR WEIL, *Examiners.*